United States Patent
Numata et al.

(10) Patent No.: US 10,488,728 B2
(45) Date of Patent: Nov. 26, 2019

(54) DISPLAY DEVICE

(71) Applicant: Japan Display Inc., Minato-ku (JP)

(72) Inventors: Yudai Numata, Tokyo (JP); Kentaro Okuyama, Tokyo (JP); Yoshihide Ohue, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/145,534

(22) Filed: Sep. 28, 2018

(65) Prior Publication Data
US 2019/0101803 A1   Apr. 4, 2019

(30) Foreign Application Priority Data
Sep. 29, 2017   (JP) ................. 2017-191511

(51) Int. Cl.
| G02F 1/1362 | (2006.01) |
| G02F 1/1334 | (2006.01) |
| G02F 1/1343 | (2006.01) |
| G02F 1/1335 | (2006.01) |
| G02F 1/1368 | (2006.01) |
| F21V 8/00 | (2006.01) |

(52) U.S. Cl.
CPC ...... *G02F 1/136286* (2013.01); *G02F 1/1334* (2013.01); *G02F 1/1343* (2013.01); *G02F 1/133615* (2013.01); *G02F 1/134309* (2013.01); *G02F 1/134336* (2013.01); *G02B 6/0036* (2013.01); *G02B 6/0038* (2013.01); *G02F 1/1368* (2013.01); *G02F 1/136227* (2013.01); *G02F 2201/12* (2013.01); *G02F 2201/122* (2013.01); *G02F 2201/123* (2013.01); *G02F 2203/03* (2013.01)

(58) Field of Classification Search
CPC ............ G02F 1/136286; G02F 1/1334; G02F 1/133615; G02F 1/1343; G02F 1/134309; G02F 1/134336; G02F 1/136227; G02F 1/1368; G02F 2201/12; G02F 2201/122; G02F 2201/123; G02F 2203/03; G02B 6/0036; G02B 6/0038
See application file for complete search history.

(56) References Cited

U.S. PATENT DOCUMENTS

| 2010/0085510 A1 | 4/2010 | Okuyama et al. |
| 2016/0070047 A1* | 3/2016 | Okuyama ............ G02B 6/005 349/71 |

FOREIGN PATENT DOCUMENTS

| JP | 2010-92682 | 4/2010 |
| JP | 2016-57338 | 4/2016 |

* cited by examiner

*Primary Examiner* — Nathanael R Briggs
(74) *Attorney, Agent, or Firm* — Oblon, McClelland, Maier & Neustadt, L.L.P.

(57) ABSTRACT

According to one embodiment, a display device includes a first substrate, a second substrate, a liquid crystal layer held between the first and the second substrates, and a light-emitting element including light-emitting portions arranged in a first direction. The first substrate includes first and second wiring lines, and a third wiring line which intersects the first and the second wiring lines. The first and the second wiring lines extend in a second direction. The third wiring line has a first side located on a side close to the light-emitting element. The first side has a first curved portion which is curved between the first and the second wiring lines.

17 Claims, 16 Drawing Sheets

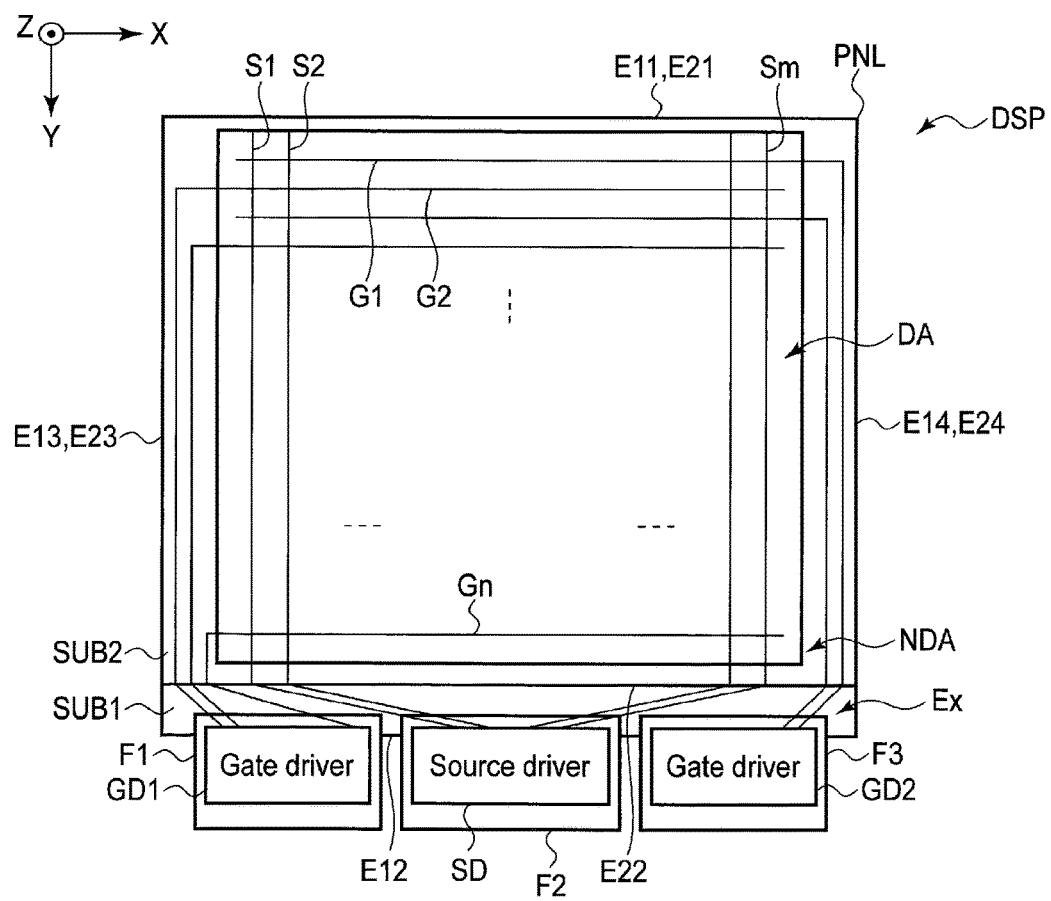
F I G. 1

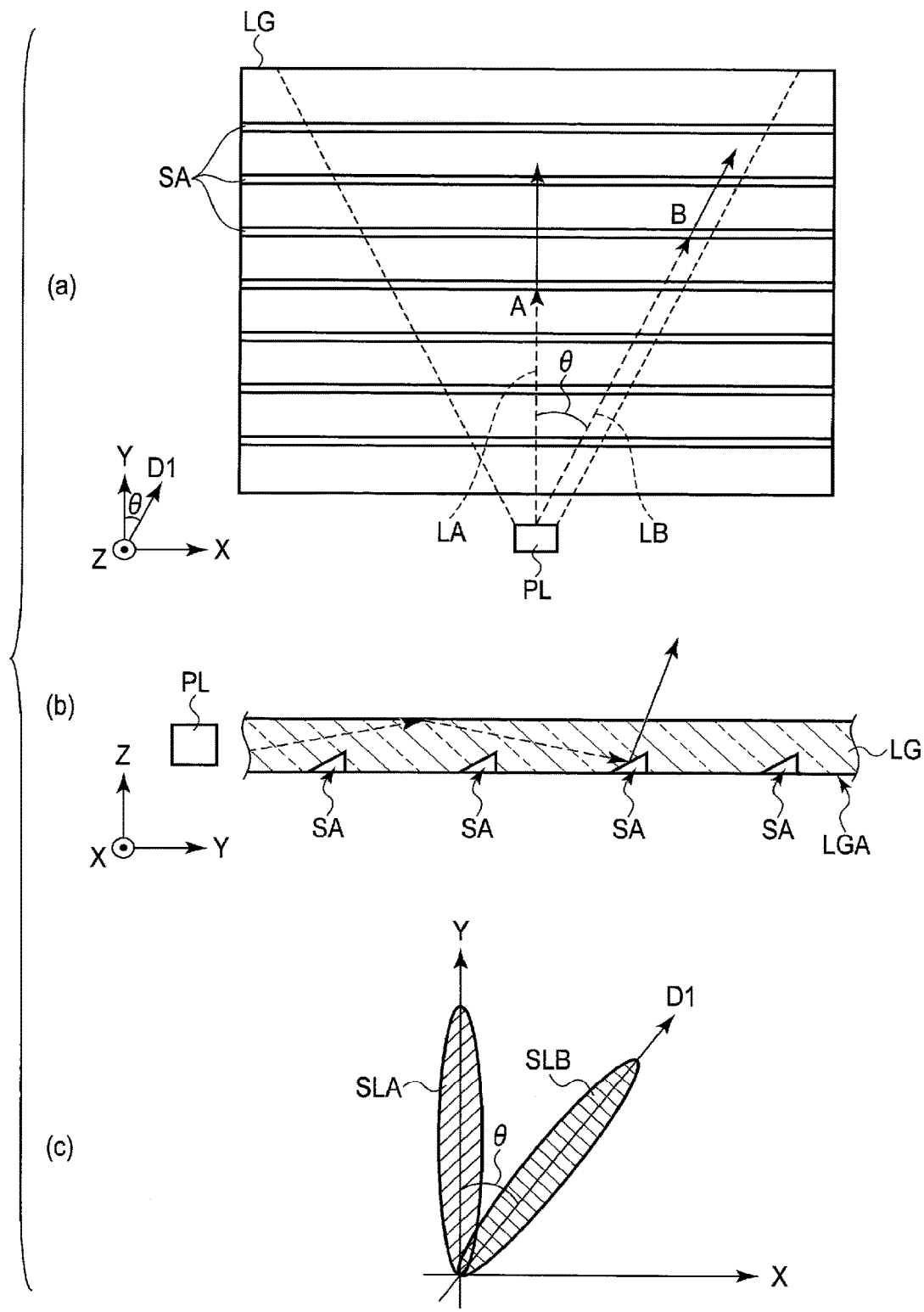
F I G. 4

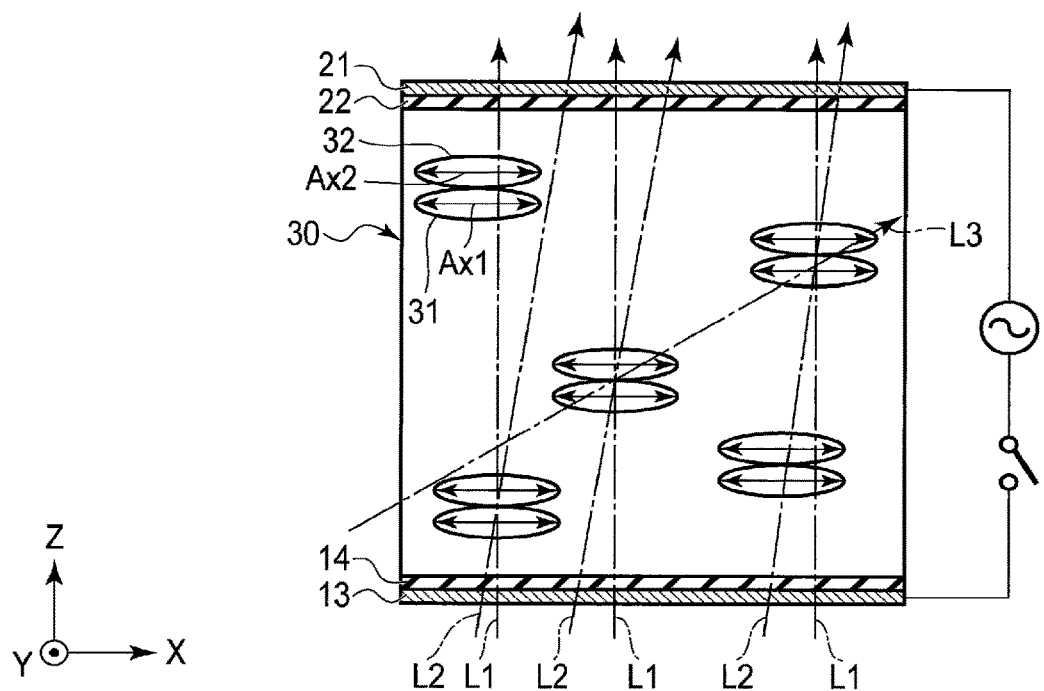
F I G. 8
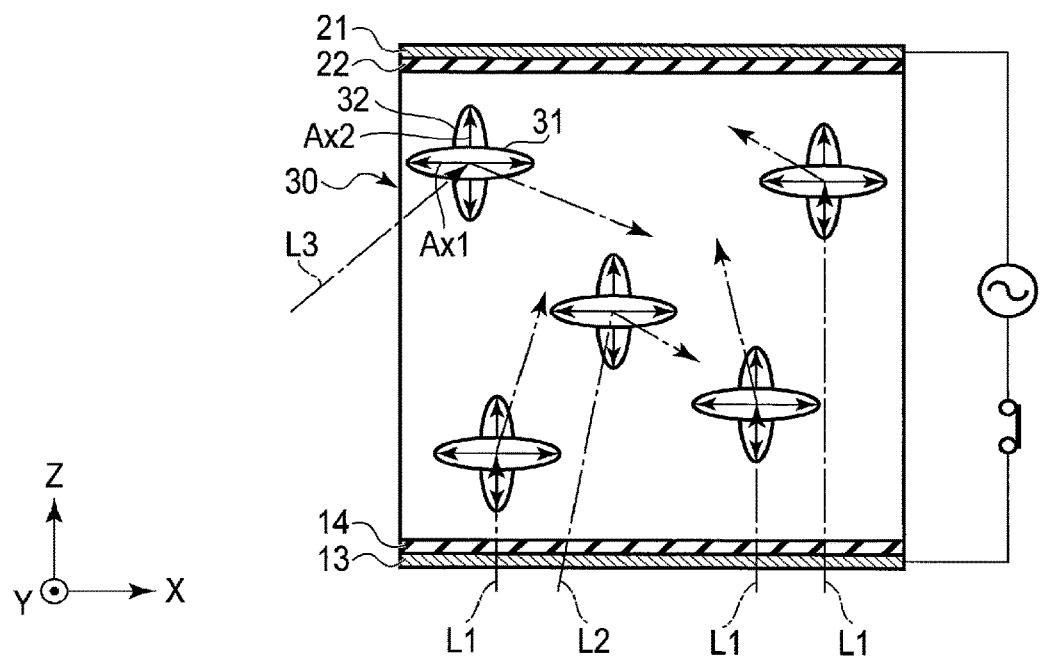
F I G. 9

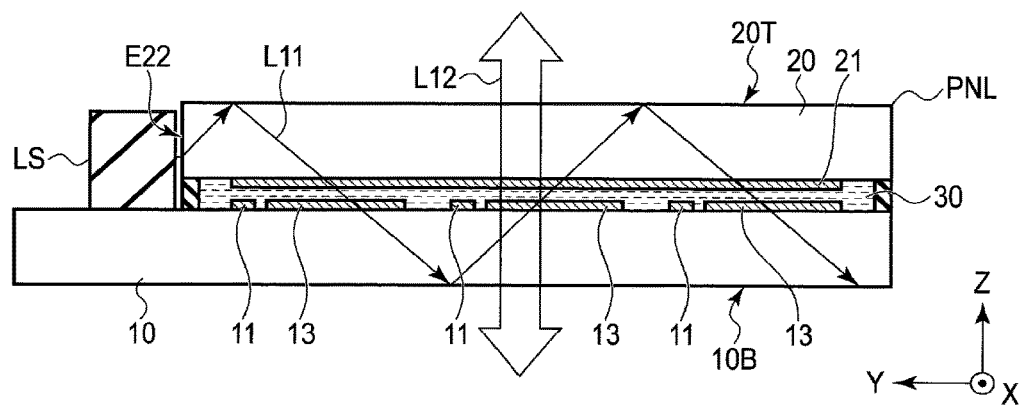
F I G. 10
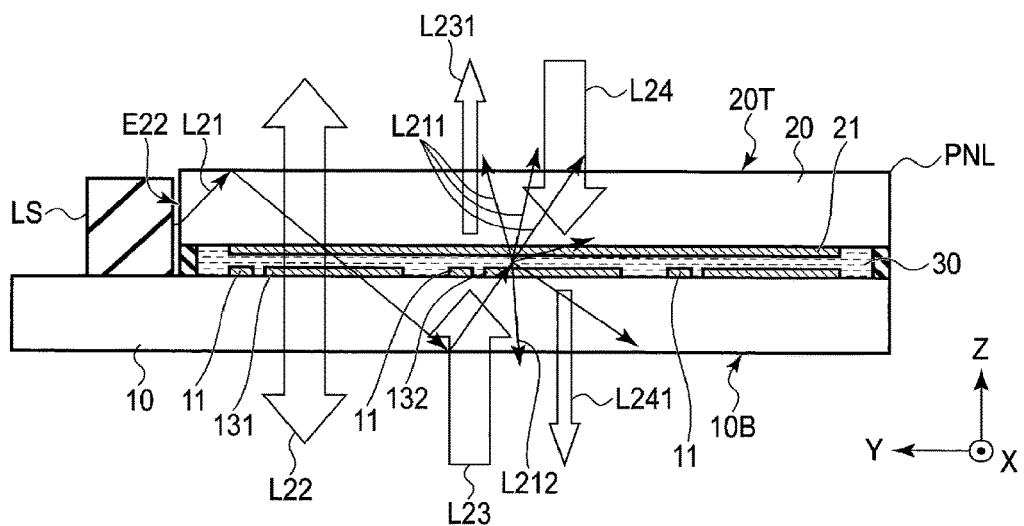
F I G. 11

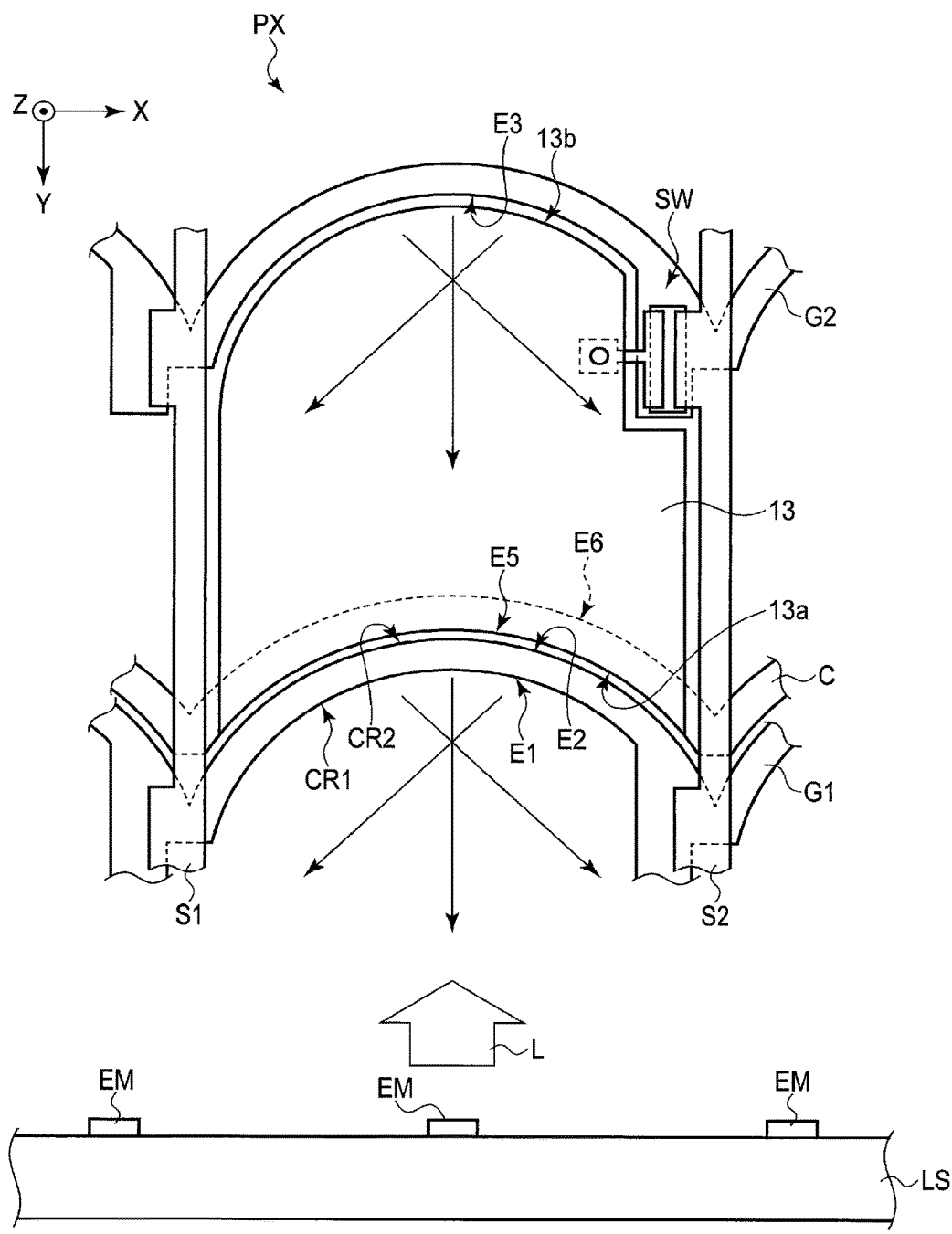
F I G. 12

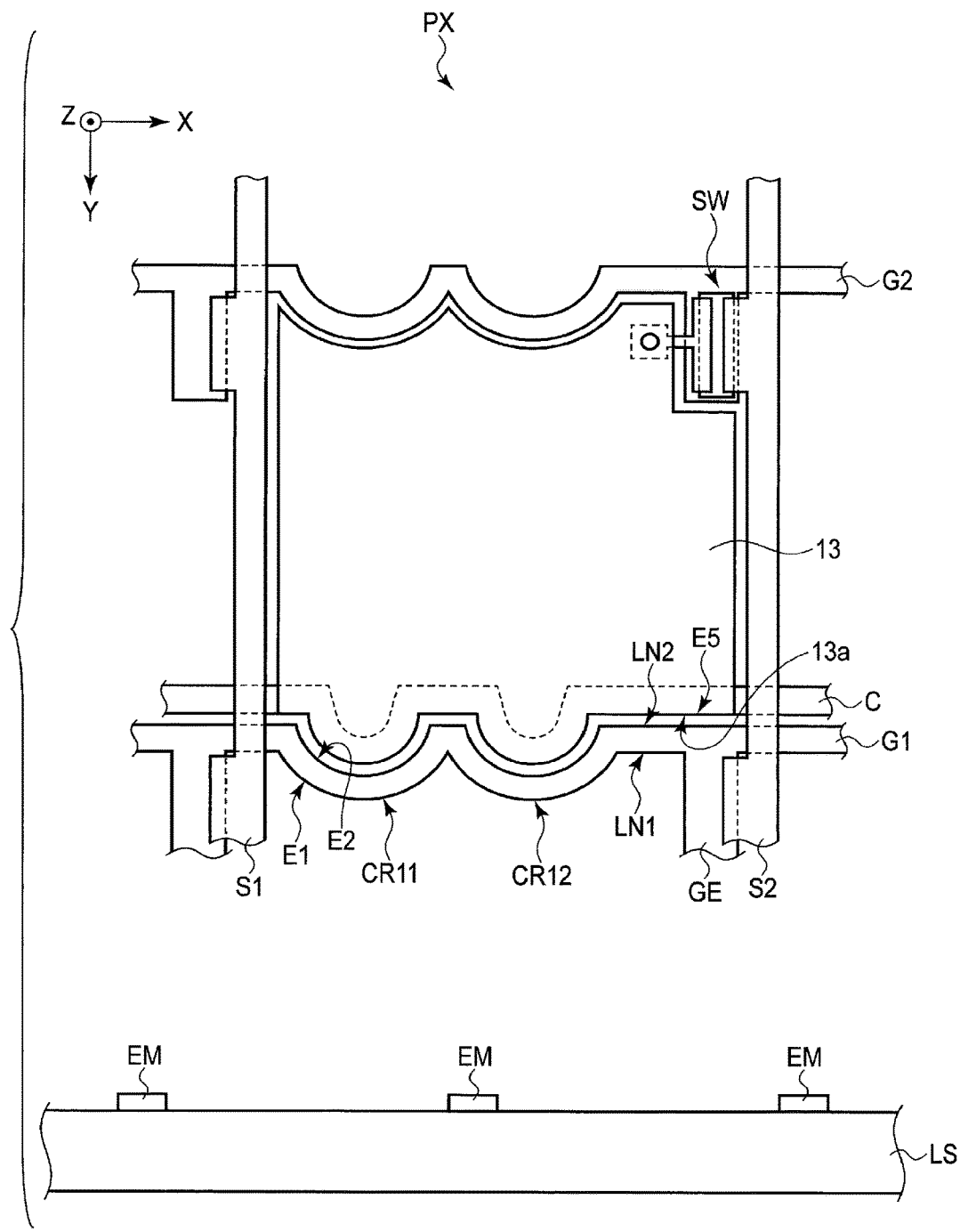
F I G. 14

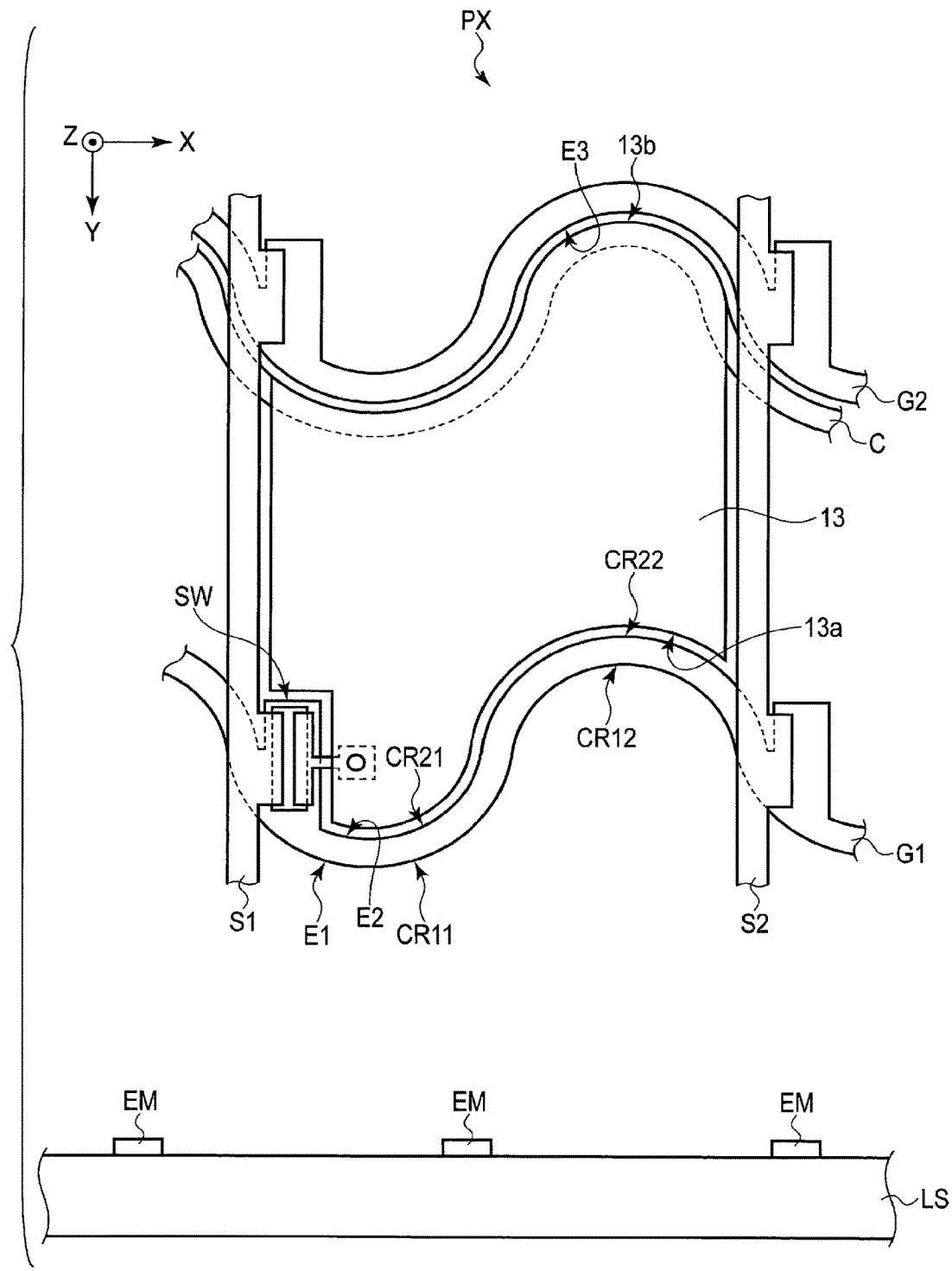
F I G. 15

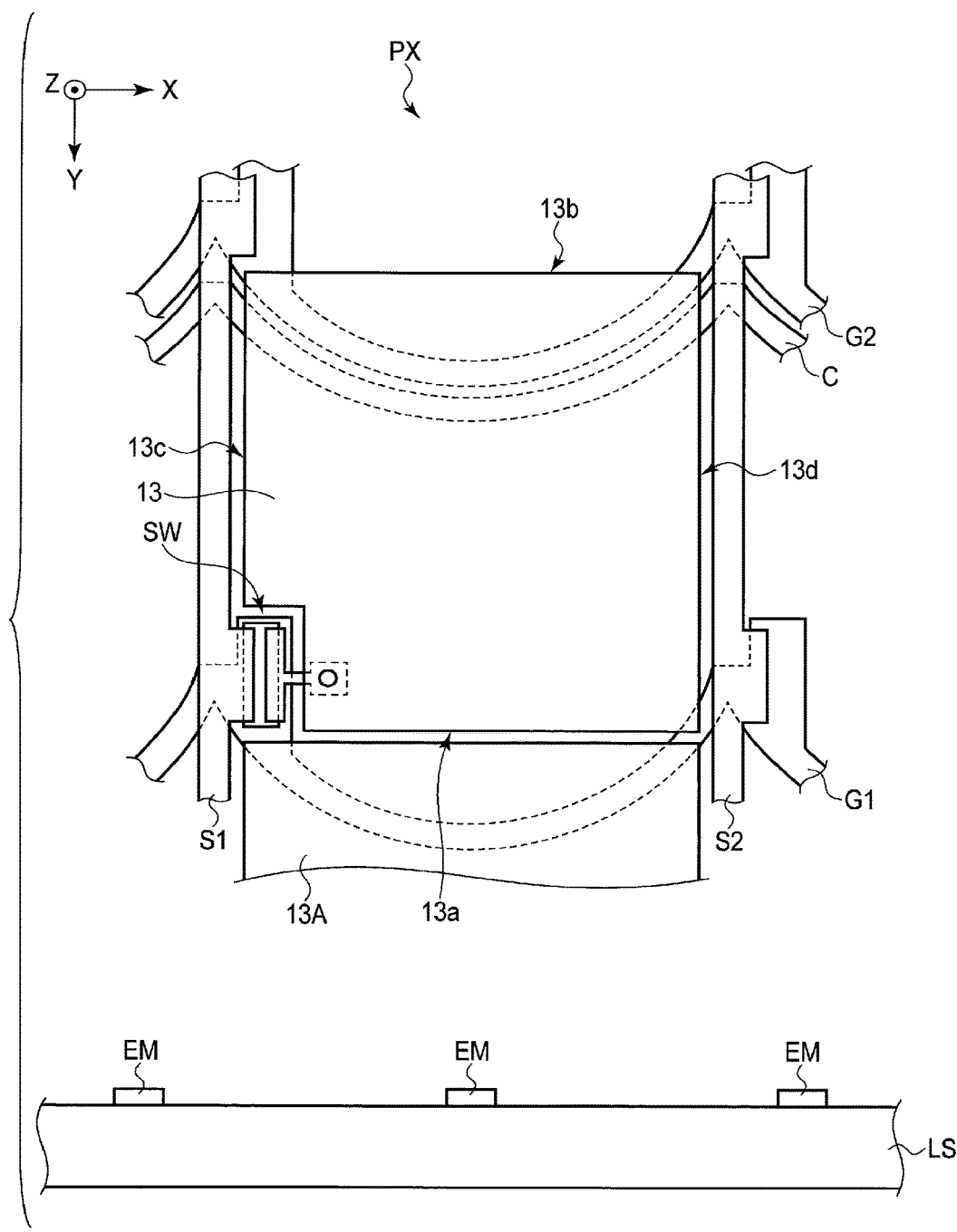
F I G. 16

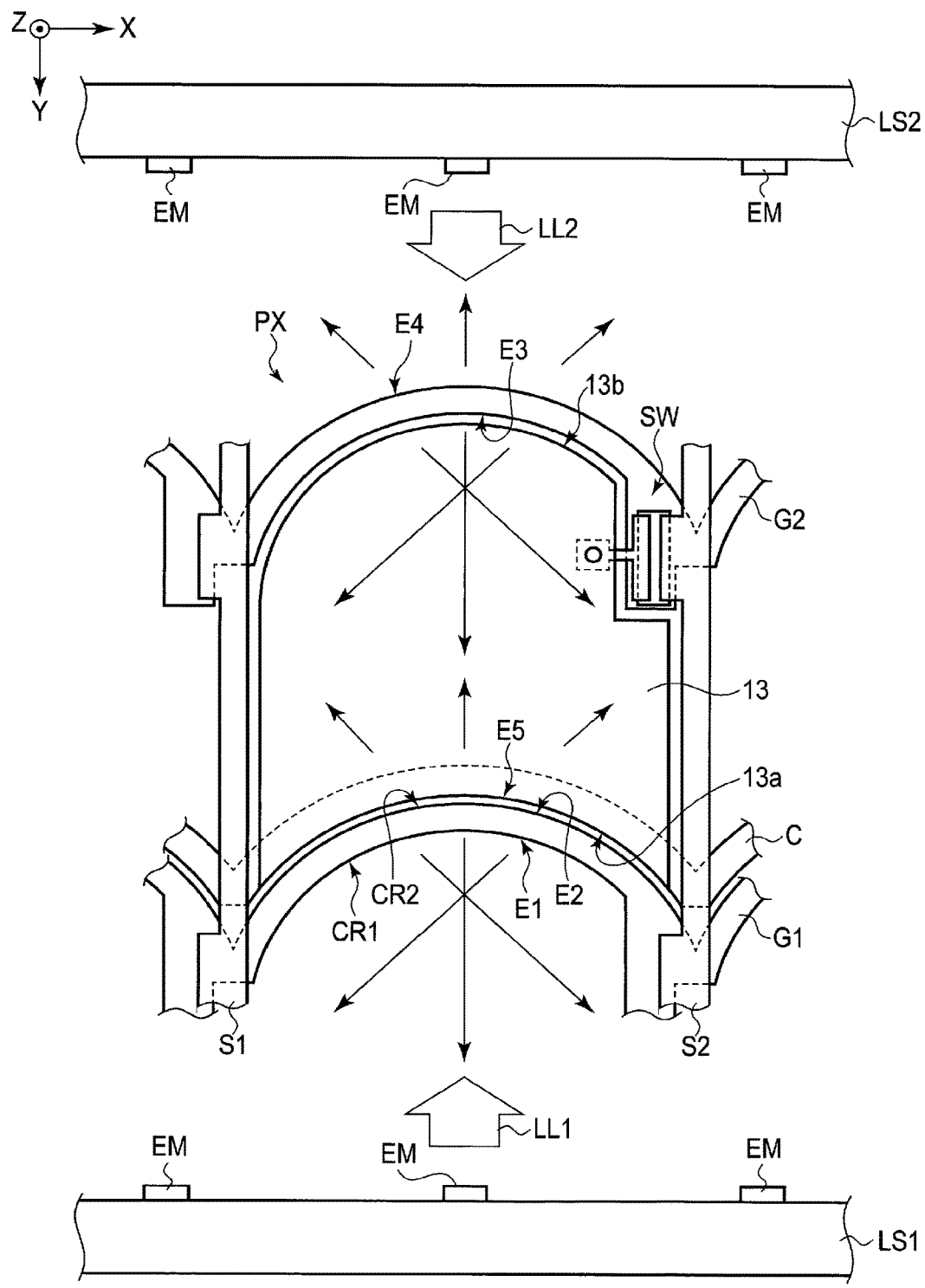
F I G. 18

DISPLAY DEVICE

CROSS-REFERENCE TO RELATED APPLICATIONS

This application is based upon and claims the benefit of priority from Japanese Patent Application No. 2017-191511, filed Sep. 29, 2017, the entire contents of which are incorporated herein by reference.

FIELD

Embodiments described herein relate generally to a display device.

BACKGROUND

Recently, various display devices using polymer dispersed liquid crystal (hereinafter referred to also as PDLC) which can switch between a diffusion state in which entering light is diffused and a transmission state in which entering light is transmitted have been proposed. In a display device using PDLC, an illumination device including a plurality of point light sources is arranged on one end side or both end sides of a display panel in some cases. In many cases, the display panel includes a plurality of linearly-extended wiring lines.

These wiring lines may cause highly-directional scattering to light which is emitted from the point light sources to the display panel in some cases. As a result, degradation of display quality such as variations of luminance according to the viewing direction of the display panel may be caused.

BRIEF DESCRIPTION OF THE DRAWINGS

FIG. 1 is a plan view showing an example of the structure of a display device in the present embodiment.

FIG. 4 is a diagram showing scatting of light in a light guide having linear grooves.

FIG. 8 is a diagram schematically showing a liquid crystal layer in a transparent state.

FIG. 9 is a diagram schematically showing the liquid crystal layer in a scattering state.

FIG. 10 is a sectional view showing the display panel in a case where the liquid crystal layer is in the transparent state.

FIG. 11 is a sectional view showing the display panel in a case where the liquid crystal layer is in the scattering state.

FIG. 12 is a plan view showing another example of the pixel.

FIG. 14 is a plan view showing another example of the pixel.

FIG. 15 is a plan view showing another example of the pixel.

FIG. 16 is a plan view showing another example of the pixel.

FIG. 18 is a plan view showing another example of the pixel.

DETAILED DESCRIPTION

Figure 2:
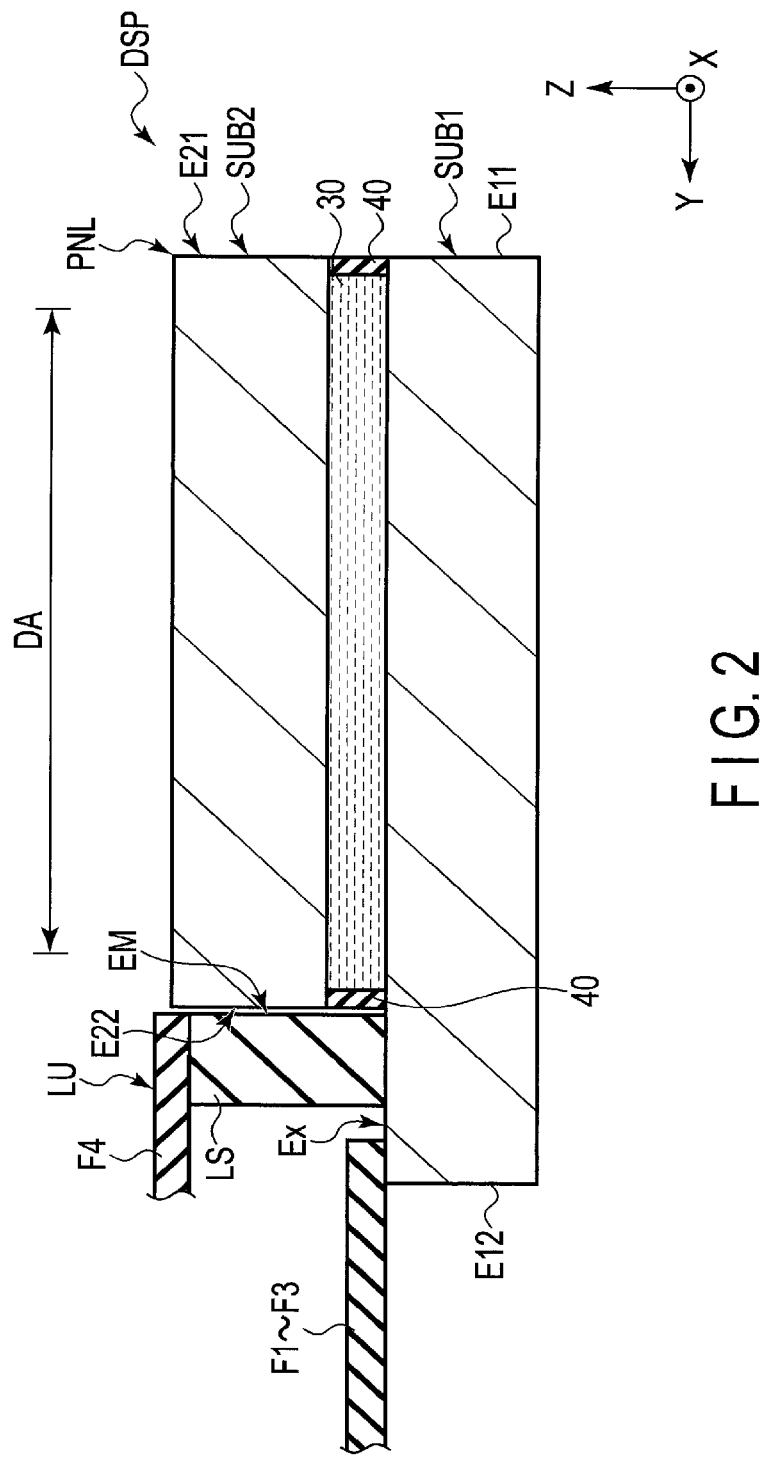
FIG. 2 is a sectional view of the display device shown in FIG. 1.

In general, according to one embodiment, there is provided a display device including a first substrate, a second substrate, a liquid crystal layer, and a light-emitting element. The first substrate includes a first wiring line and a second wiring line which are adjacent to each other, and a third wiring line which intersects the first wiring line and the second wiring line. The second substrate is opposed to the first substrate. The liquid crystal layer is held between the first substrate and the second substrate and contains a polymer subjected to alignment treatment and a liquid crystal molecule. The light-emitting element includes light-emitting portions arranged in a first direction. The first wiring line and the second wiring line extend in a second direction intersecting the first direction. The third wiring line has a first side located on a side close to the light-emitting element. The first side has a first curved portion which is curved between the first wiring line and the second wiring line.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

FIG. 1 is a plan view showing an example of the structure of a display device DSP according to the present embodiment. In the drawing, a first direction X and a second direction Y intersect each other, and a third direction Z intersects the first direction X and the second direction Y. For example, the first direction X, the second direction Y and the third direction Z orthogonally intersect each other but may intersect each other at an angle other than an angle of 90 degrees. In the present specification, the direction of the pointing end of an arrow indicating the third direction Z is referred to as above, and the direction opposite to the pointing end of the arrow is referred to as below. Such expressions as "a second member above a first member" and "a second member below a first member" mean that the second member may be in contact with the first member or may be away from the first member. Further, the display device DSP is assumed to be viewed from a viewing position located on the pointing end side of the arrow indicating the third direction Z, and a view from the viewing position toward an X-Y plane defined by the first direction X and the second direction Y is defined as a plan view.

In the present embodiment, a display device adopting polymer dispersed liquid crystal will be described an example of the display device. The display device DSP includes a display panel PNL, wiring substrates F1 to F3 and a light source unit which is not shown in the drawing.

The display panel PNL includes a first substrate SUB1 and a second substrate SUB2. The first substrate SUB1 and the second substrate SUB2 overlap each other in a plan view. The display panel PNL includes a display area DA in which an image is displayed and a non-display area NDA which has the shape of a frame and surrounds the display area DA. The display area DA is located in an area in which the first substrate SUB1 and the second substrate SUB2 overlap each other. The display panel PNL includes a plurality of scanning lines G and a plurality of signal lines S in the display area DA. The number of the scanning lines G and the number of the signal lines S may be the same as each other or may be different from each other. In the example illustrated, the scanning lines G extend in the first direction X and are arranged at interval in the second direction Y. The signal lines S extend in the second direction Y and are arranged at intervals in the first direction X.

The first substrate SUB1 has ends E11 and E12 which extend in the first direction X and ends E13 and E14 which extend in the second direction Y. The second substrate SUB2 has ends E21 and E22 which extend in the first direction X and ends E23 and E24 which extend in the second direction Y. In a plan view, the end E11 and the end E21, the end E13 and the end E23, and the end E14 and the end E24 overlap each other in the example illustrated but may not overlap each other. The end E22 is located between the end E12 and the display area DA in a plan view. The first substrate SUB1 has an extension Ex between the end E12 and the end E22.

The wiring substrates F1 to F3 are connected to the extension Ex, respectively, and are arranged in this order in the first direction X. The wiring substrate F1 includes a gate driver GD1. The wiring substrate F2 includes a source driver SD. The wiring substrate F3 includes a gate driver GD2. The wiring substrates F1 to F3 may be replaced with a single wiring substrate.

The signal lines S are drawn to the non-display area NDA and are connected to the source driver SD. The scanning lines G are drawn to the non-display area NDA and are connected to the gate drivers GD1 and GD2. In the example illustrated, odd-numbered scanning lines G are drawn between the end E14 and the display area DA and are connected to the gate driver GD2. Further, even-numbered scanning lines G are drawn between the end E13 and the display area DA and are connected to the gate driver GD1. The connection relationship between the gate drivers GD1 and GD2 and the scanning lines G is not limited to that of the example illustrated.

FIG. 2 is a sectional view of the display device DSP shown in FIG. 1. In a cross-section of the display device DSP in a Y-Z plane defined by the second direction Y and the third direction Z, only main portions will be described. The display panel PNL includes a liquid crystal layer 30 held between the first substrate SUB1 and the second substrate SUB2. The first substrate SUB1 and the second substrate SUB2 are attached together with a sealant 40.

A light source unit LU includes a light-emitting element LS, a wiring substrate F4, etc. The light-emitting element LS is connected to the wiring substrate F4. In the example illustrated, the light-emitting element LS is located on the extension Ex. Further, the light-emitting element LS is located between the wiring substrates F1 to F3 and the second substrate SUB2. The light-emitting element LS has a light-emitting portion EM opposed to the end E22. The light-emitting element LS emits light from the light-emitting portion EM to the end E22. The light entering from the end E2 propagates through the display panel PNL in the second direction Y as will be described later. The light-emitting element LS may be opposed to both the end of the first substrate SUB1 and the end of the second substrate SUB2 and may be opposed to, for example, the ends E11 and E21.

Figure 3:
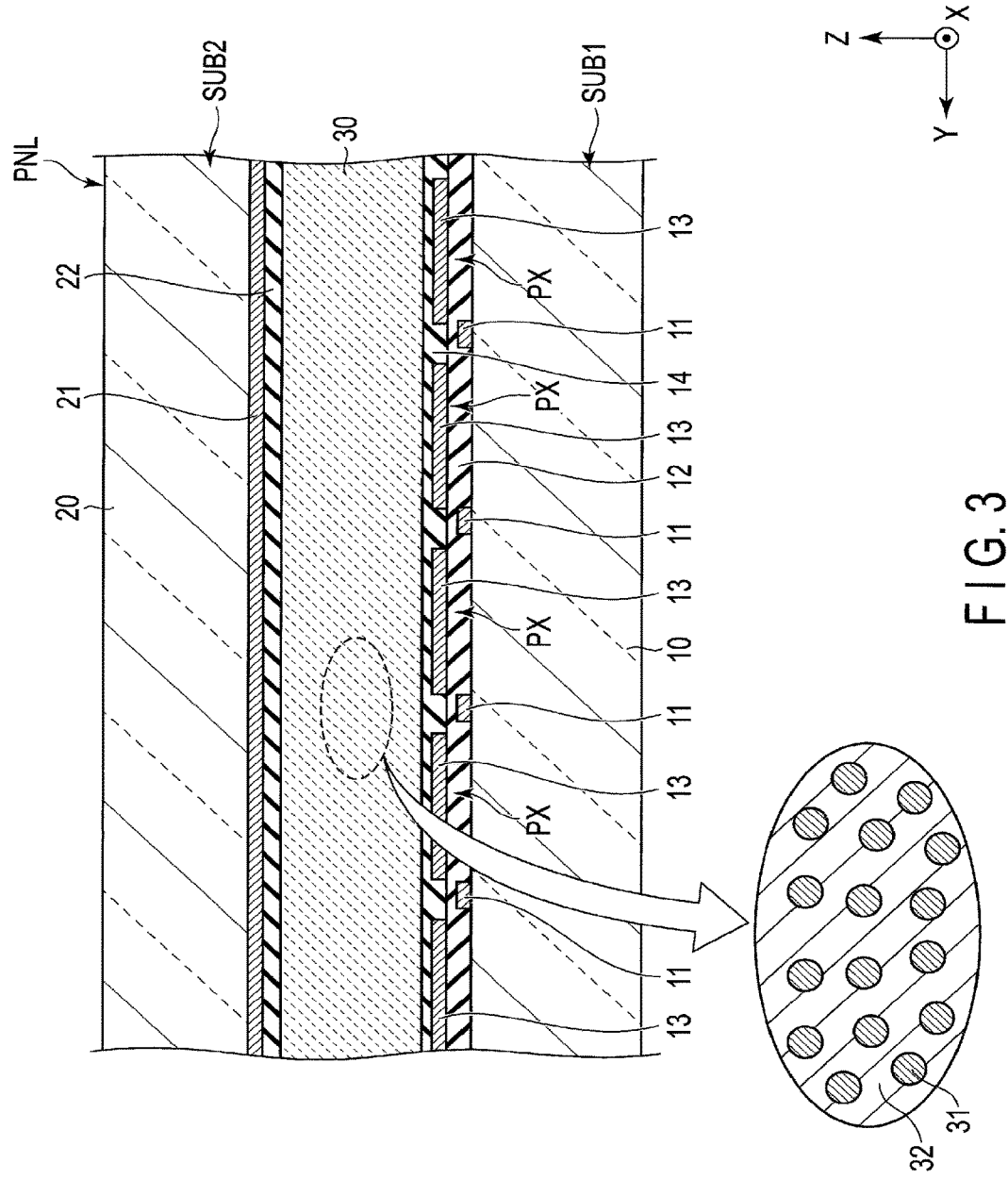
FIG. 3 is a sectional view showing an example of the structure of a display panel shown in FIG. 2.

FIG. 3 is a sectional view showing an example of the structure of the display panel PNL shown in FIG. 2. The first substrate SUB1 includes a transparent substrate 10, a wiring line 11, an insulating layer 12, a pixel electrode 13 and an alignment film 14. The second substrate SUB2 includes a transparent substrate 20, a common electrode 21 and an alignment film 22. The second substrate SUB2 does not include a light-shielding layer which overlaps the wiring line 11.

The transparent substrates 10 and 20 are insulating substrates such as glass substrates or plastic substrates. The wiring line 11 is formed of a nontransparent metal material such as molybdenum, tungsten, aluminum, titanium or silver. The illustrated wiring line 11 extends in the first direction X but may extend in the second direction Y. The insulating layer 12 is formed of a transparent insulating material. The pixel electrode 13 and the common electrode 21 are formed of a transparent conductive material such as indium tin oxide (ITO) or indium zinc oxide (IZO). The pixel electrode 13 is arranged in each pixel PX. The common electrode 21 is arranged across the pixels PX. The alignment films 14 and 22 may be horizontal alignment films which have alignment restriction force substantially parallel to the X-Y plane or may be vertical alignment films which have alignment restriction force substantially parallel to the third direction Z.

The liquid crystal layer 30 is located between the alignment film 14 and the alignment film 22. The liquid crystal layer 30 includes polymer dispersed liquid crystal containing a polymer 31 which is a polymer compound and a liquid crystal molecule 32. For example, the polymer 31 is a liquid crystal polymer. The polymer 31 can be obtained by, for example, polymerizing a liquid crystal monomer which is aligned in a predetermined direction by the alignment restriction force of the alignment films 14 and 22. For example, the alignment treatment direction of the alignment films 14 and 22 is the first direction X, and the alignment films 14 and 22 have alignment restriction force in the first direction X. Therefore, the polymer 31 is formed in the shape of a stripe extending in the first direction X. The liquid crystal molecules 32 are dispersed in the gaps of the polymers 31, and the major axes of the liquid crystal molecules 32 are aligned with the first direction X. In the enlarged portion in the drawing, the polymer 31 is shown by rising diagonal lines, and the liquid crystal molecule 32 is shown by falling diagonal lines.

Each of the polymer 31 and the liquid crystal molecule 32 has an optical anisotropy or a refractive anisotropy. The liquid crystal molecule 32 may be a positive liquid crystal molecule having a positive dielectric anisotropy or may be a negative liquid crystal molecule having a negative dielectric anisotropy. The polymer 31 and the liquid crystal molecule 32 differ from each other in responsiveness to an electric field. The responsiveness of the polymer 31 to an electric field is lower than the responsiveness of the liquid crystal molecule 32 to the electric field.

Next, the relationship between the shape of a scatterer provided in a medium and the scattering of light will be described with reference to FIGS. 4 and 5. Here, light emitted from a point light source PL is assumed to propagate through a light guide LG.

FIG. 4 shows a case where the light guide LG has a linear groove SA as a scatterer. FIG. 4(a) is a plan view showing an example of the light guide LG. In the example illustrated, the grooves SA extend in the first direction X and are arranged at intervals in the second direction Y. The point light source PL is arranged on one end side of the light guide LG in the second direction Y. FIG. 4(b) is a sectional view of the light guide LG shown in FIG. 4(a). The groove SA has a cross-section of, for example, a substantially rectangular shape. The groove SA is formed in one surface LGA of two surfaces of the light guide LG parallel to the X-Y plane. The light propagating through the light guide LG is scattered in the groove SA. More specifically, when the light propagating through the light guide LG reaches the groove SA, the light is scattered at the interface of the light guide LG and, for example, air. In the example illustrated, the light propagating through the light guide LG is scattered by a surface of the groove SA which is located on the point light source PL side.

In the above-described structure, a direction in which light emitted from the point light source PL to the light guide LG is scattered relies on the incident direction of the light. In other words, as is the case with the groove SA, if a surface at which light is scattered extends linearly, highly-directional scattering occurs. In the example shown in FIG. 4(a), light LA entering the light guide LG in the second direction Y is scattered at, for example, a position A and is emitted substantially in the second direction Y. Of the light emitted from the pointed light source PL, light LB entering the light guide LG in a direction D1 deviated from the second direction Y by an angle θ is scattered at, for example, a position B and is emitted substantially in the direction D1. In FIG. 4(a), not-yet-scattered light is shown by an arrow of a broken line, and scattered light is shown by an arrow of a solid line.

FIG. 4(c) is a diagram schematically showing the distribution of scattered light in the X-Y plane. Here, an area in which the intensity of scattered light SLA scattered at the position A is a predetermined value or more is shown by rising diagonal lines, and an area in which the intensity of scattered light SLB scattered at the position B is a predetermined value or more is shown by falling diagonal lines. In the graph, the positions A and B are corrected such that the ends of the areas will be located at the origin of the graph. The scattered light SLA is mainly distributed in the second direction Y. On the other hand, the scattered light SLB is distributed in the direction D1. Therefore, the viewer who views the light guide LG in the direction D1 does not visually recognize the scattered light SLA but only visually recognizes the scattered light SLB. As a result, it appears to the viewer that a high-luminance area is distributed in the shape of a stripe over the light guide LG. In other words, the luminance distribution of the light guide LG varies according to the viewing direction of the viewer.

Figure 5:
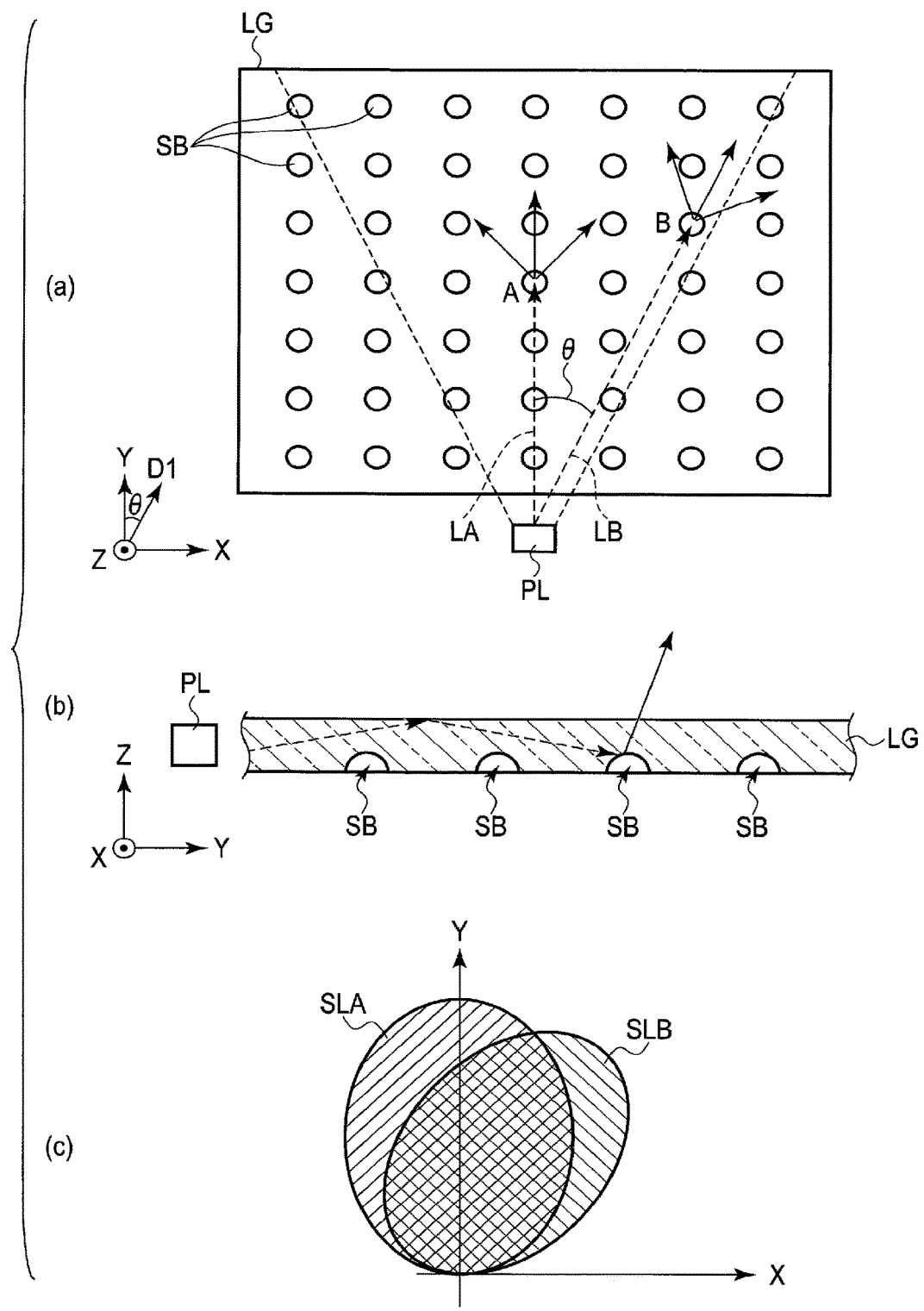
FIG. 5 is a diagram showing scatting of light in a light guide having hemispherical recesses.

FIG. 5 shows a case where the light guide LG has an island-like recess SB as a scatterer. FIG. 5(a) is a plan view showing an example of the light guide LG. In the example illustrated, the recesses SB are arranged in a matrix in the first direction X and the second direction Y. The point light source PL is arranged on one end side of the light guide LG in the second direction Y. FIG. 5(b) is a sectional view of the light guide LG shown in FIG. 5(a). The recess SB is provided in the surface LGA parallel to the X-Y plane. The recess SB is, for example, hemispherical. That is, the recess SB has a curved surface. The light propagating through the light guide LG is scattered at the curved surface of the recess SB.

In the above-described structure, a direction in which light emitted from the point light source PL to the light guide LG is scattered hardly relies on the incident direction of the light. In other words, as is the case with the recess SB, if a surface at which light is scattered is a curved surface, the directivity of scattered light is reduced. In the example shown in FIG. 5(a), the light LA and LB are scattered at the positions A and B in such a manner as to be diffused from the recesses SB.

FIG. 5(c) is a diagram schematically showing the distribution of scattered light in the X-Y plane. Here, an area in which the intensity of scattered light SLA scattered at the position A is a predetermined value or more is shown by rising diagonal lines, and an area in which the intensity of scattered light SLB scattered at the position B is a predetermined value or more is shown by falling diagonal lines. As compared to FIG. 4(c), the distribution areas of the scattered light SLA and SLB are close to a circular shape and widely overlap each other. Therefore, the viewer who views the light guide LG in the direction D1 can visually recognize both the scattered light SLA and the scattered light SLB. In other words, the luminance distribution of the light guide LG hardly relies on the viewing direction of the viewer.

Figure 6:
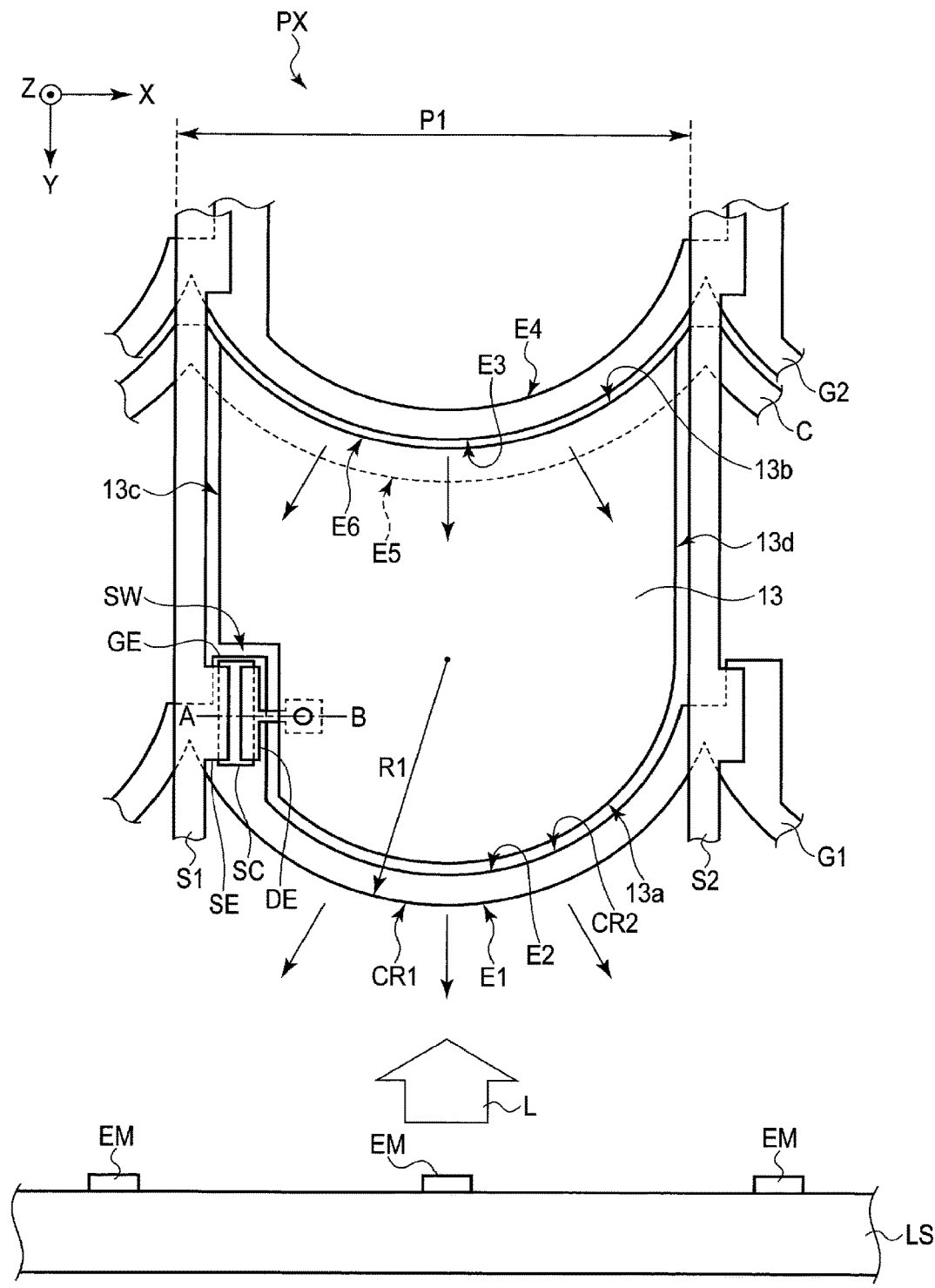
FIG. 6 is a plan view showing an example of a pixel shown in FIG. 3.

FIG. 6 is a plan view showing an example of the pixel PX shown in FIG. 3. In the example illustrated, the pixel PX is defined by two signal lines S1 and S2 arranged in the first direction X and two scanning lines G1 and G2 arranged in the second direction Y. The scanning line G1 is closer to the light-emitting element LS than the scanning line G2 is to the light-emitting element LS.

In the example illustrated, the light-emitting element LS extends in the first direction X. More specifically, the light-emitting element LS includes the plurality of light-emitting portions EM arranged in the first direction X. In a case where the distance between the light-emitting portion EM and the light-emitting portion EM is sufficiently large, the light-emitting portion EM may be regarded as a point light source. The light emitted from the light-emitting element LS propagates through the display panel PNL macroscopically in the second direction Y.

The signal lines S1 and S2 extend in the direction away from the light-emitting element LS. That is, the signal lines S1 and S2 extend in the second direction Y. In other words, the signal lines S1 and S2 extend in the propagating direction of light L which is emitted from the light-emitting element LS and propagates through the display panel PNL. In the example illustrated, the signal lines S1 and S2 extend linearly and are formed in the shape of a strip having a substantially constant width except for the vicinity of a switching element SW which will be described later.

The scanning lines G1 and G2 intersect the signal lines S1 and S2. In other words, the scanning lines G1 and G2 extend in the direction intersecting the propagating direction of the light L. As described above with reference to FIG. 5, if a surface at which light is scattered is a curved surface, the directivity of scattered light is reduced. Therefore, in the present embodiment, the scanning lines G1 and G2 are curved between the signal lines S1 and S2. In the example illustrated, the scanning lines G1 and G2 are convex toward the light-emitting element LS side.

More specifically, the scanning line G1 has a side E1 located on the light-emitting element LS side and a side E2 on the opposite side to the side E1 (a side located on the side away from the light-emitting element LS). In the example illustrated, the distance between the side E1 and the side E2 is substantially constant except for the vicinity of the switching element SW.

The side E1 has a curved portion CR1 which is curved between the signal line S1 and the signal line S2. The side E2 has a curved portion CR2 which is curved along the curved portion CR1 between the signal line S1 and the signal line S2. The curved portions CR1 and CR2 are convex toward the light-emitting element LS side. That is, the side E1 located between the signal line S1 and the signal line S2 is closer to the light-emitting element LS than the side E1 overlapping the signal lines S1 and S2 is to the light-emitting element LS. Similarly, the side E2 located between the signal line S1 and the signal line S2 is closer to the light-emitting element LS than the side E2 overlapping the signal lines S1 and S2 is to the light-emitting element LS. In the example illustrated, the sides E1 and E2 are closest to the light-emitting element LS substantially at the center between the signal line S1 and the signal line S2.

For example, the shape of the curved portions CR1 and CR2 is the shape of the circumference of a circle. In the example illustrated, a radius of curvature R1 of the curved portion CR1 is substantially equal to the length of a half of the distance (pitch) P1 between the signal line S1 and the signal line S2. The radius of curvature R1 should preferably be less than or equal to half the distance P1. The shape of the curved portions CR1 and CR2 only have to be the shape of a curve and is not limited to the shape of the circumference of a circle. For example, the curved portions CR1 and CR2 may have the shape of the circumference of an ellipse, may have a plurality of radii of curvature, or may have different shapes from each other. Further, as will be described later, the curved portions CR1 and CR2 may be convex in the direction away from the light-emitting element LS. Further, the sides E1 and E2 may have a plurality of curved portions.

The scanning line G2 has the same shape as that of the scanning line G1. That is, the scanning line G2 have a side E3 located on the light-emitting element LS side and a side E4 located on the opposite side to the side E3 (a side located on the side away from the light-emitting element LS). The sides E3 and E4 are curved to be convex toward the light-emitting element LS side between the signal line S1 and the signal line S2.

The pixel PX includes the switching element SW and the pixel electrode 13. The switching element SW is, for example, a thin-film transistor. In the example illustrated, the switching element SW is electrically connected to the scanning line G1 and the signal line S1. The switching element SW is closer to the signal line S1 than to the signal line S2 in the first direction X and is closer to the scanning line G1 than to the scanning line G2 in the second direction Y. The curved portion CR1 is provided between the switching element SW and the signal line S2 in the first direction X.

The switching element SW includes a semiconductor layer SC, a gate electrode GE, a source electrode SE and a drain electrode DE. The gate electrode GE is integrally formed with the scanning line G1. In the example illustrated, the switching element SW is a bottom-gate type switching element in which the gate electrode GE is located below the semiconductor layer SC, but may be a top-gate type switching element in which the gate electrode GE is located above the semiconductor layer SC. The semiconductor layer SC is formed of, for example, amorphous silicon but may be formed of polycrystalline silicon or an oxide semiconductor. The source electrode SE is integrally formed with the signal line S1 and contacts the semiconductor layer SC. The drain electrode DE is separated from the source electrode SE and contacts the semiconductor layer SC. The pixel electrode 13 overlaps the drain electrode DE from above and contacts the drain electrode DE in a contact hole CH.

The pixel electrode 13 is arranged between the signal line S1 and the signal line S2 and between the scanning line G1 and the scanning line G2. The scanning line G1 is located between the pixel electrode 13 and the light-emitting element LS in the second direction Y. In the example illustrated, the pixel electrode 13 has substantially the same shape as the shape of an area surrounded by the signal lines S1 and S2 and the scanning lines G1 and G2 except for the vicinity of the switching element SW. The pixel electrode 13 has a side 13a opposed to the scanning line G1, a side 13b opposed to the scanning line G2, a side 13c opposed to the signal line S1 and a side 13d opposed to the signal line S2. The side 13a is curved along the side E2. The side 13b is curved along the side E3. The sides 13c and 13d extend linearly in the second direction Y.

A capacitive line C is arranged between the scanning line G1 and the scanning line G2. The capacitive line C overlaps the pixel electrode 13. For example, the capacitive line C is located on the scanning line G2 side below the pixel electrode 13. A portion in which the capacitive line C and the pixel electrode 13 overlap each other forms storage capacitance. In the present embodiment, the capacitive line C is curved similarly to the scanning lines G1 and G2. That is, in the example illustrated, a side E5 of the capacitive line C on the scanning line G1 side is curved similarly to the side E3. A side E6 of the capacitive line C on the scanning line G2 side is aligned with the side 13b in a plan view.

In the above-described structure, the light L which propagates through the display panel PNL is scattered mainly by wiring lines which extend in the direction intersecting the propagating direction of the light L among various wiring lines which are arranged in the display panel PNL. Here, the scanning lines G1 and G2, the capacitive line C, etc., correspond to the above-described wiring lines. In the scanning line G1, the amount of light scattered by the side E1 is larger than the amount of light scattered by the side E2. Further, in the scanning line G2, the amount of light scattered by the side E3 is larger than the amount of light scattered by the side E4.

The light scattered by the sides E1 and E3 are schematically shown by arrows of thin solid lines in FIG. 6. In the side E1, the light scattered by the curved portion CR1 is diffused substantially isotropically from the curved portion CR1. This curved portion CR1 corresponds to, for example, the recess SB shown in FIG. 5(a). Similarly in the side E3, the light scattered by the curved portion of the side E3 is diffused substantially isotropically. Although not shown in the drawing, the same is also applied to the light scattered in the side 13a.

Figure 7:
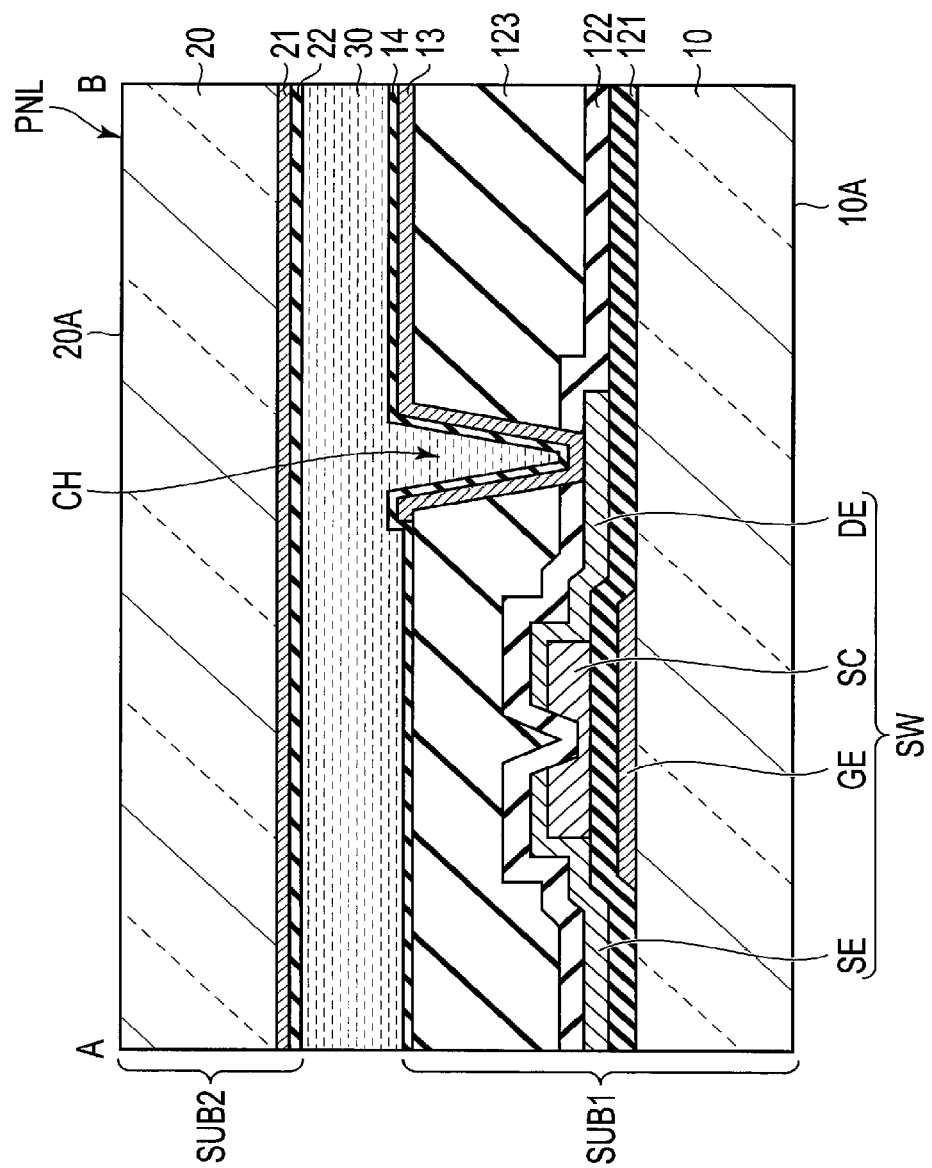
FIG. 7 is a sectional view of the pixel taken along line A-B shown in FIG. 6.

FIG. 7 is a sectional view of the pixel PX taken along line A-B shown in FIG. 6.

In the first substrate SUB1, the gate electrode GE, and the scanning line G and the capacitive line C which are not shown in the drawing are located on the transparent substrate 10 and correspond to, for example, the wiring lines 11 shown in FIG. 3. An insulating layer 121 covers the gate electrode GE and the transparent substrate 10. The semiconductor layer SC is located on the insulating layer 121 directly above the gate electrode GE. The source electrode SE and the drain electrode DE are located on the insulating layer 121 and contact the semiconductor layer SC, respectively. An insulating layer 122 covers the semiconductor layer SC, the source electrode SE, the drain electrode DE and the insulating layer 121. An insulating layer 123 covers the insulating layer 122. The insulating layers 121 to 123 correspond to, for example, the insulating layer 12 shown in FIG. 3. The insulating layers 121 and 122 are formed of a transparent inorganic insulating material such as silicon nitride or silicon oxide. The insulating layer 123 is formed of a transparent organic insulating material such as acrylic resin. The pixel electrode 13 is located on the insulating layer 123. The pixel electrode 13 contacts the drain electrode DE in the contact hole CH which penetrates the insulating layers 122 and 123. The alignment film 14 covers the pixel electrode 13 and the insulating layer 123.

In the second substrate SUB2, the common electrode 21 is located below the transparent substrate 20. The alignment film 22 covers the common electrode 21. The liquid crystal layer 30 contacts the alignment films 14 and 22.

FIG. 8 is a diagram schematically showing the liquid crystal layer 30 in a transparent state. The example illustrated corresponds to a state in which no voltage is applied to the liquid crystal layer 30 (for example, a state in which the potential difference between the pixel electrode 13 and the common electrode 21 is almost zero). An optical axis Ax1 of the polymer 31 and an optical axis Ax2 of the liquid crystal molecule 32 are parallel to each other. In the example illustrated, the optical axis Ax1 and the optical axis Ax2 are parallel to the first direction X. The polymer 31 and the liquid crystal molecule 32 have substantially the same refractive anisotropy. That is, the polymer 31 and the liquid crystal molecule 32 have substantially the same ordinary refractive index, and the polymer 31 and the liquid crystal molecule 32 have substantially the same extraordinary refractive index. Therefore, the refractive index of the polymer 31 and the refractive index of the liquid crystal molecule 32 hardly differ from each other in all directions including the first direction X, the second direction Y and the third direction Z. Therefore, light L1 entering the liquid crystal layer 30 in the third direction Z is hardly scattered in the liquid crystal layer 30 and is transmitted through the liquid crystal layer 30. Similarly, light L2 and light L3 entering in oblique directions which are inclined with respect to the third direction Z are hardly scattered in the liquid crystal layer 30. Therefore, high transparency can be achieved. The state shown in FIG. 8 is referred to as a transparent state. For example, the light L3 corresponds to light emitted from the light-emitting element LS shown in FIG. 3, and the light L3 is hardly scattered in the liquid crystal layer 30 and propagates through the liquid crystal layer 30 in the opposite direction to the arrow indicating the second direction Y.

FIG. 9 is a diagram schematically showing the liquid crystal layer 30 in a scattering state. The example illustrated corresponds to a state in which voltage is applied to the liquid crystal layer 30 (for example, a state in which the potential difference between the pixel electrode 13 and the common electrode 21 is greater than or equal to a threshold value). As described above, the responsiveness of the polymer 31 to an electric field is lower than the responsiveness of the liquid crystal molecule 32 to the electric field. For example, the alignment direction of the polymer 31 hardly changes regardless of whether an electric field is present or absent. On the other hand, the alignment direction of the liquid crystal molecule 32 changes according to an electric field in a state where a voltage of a threshold value or more is applied to the liquid crystal layer 30. That is, as shown in the drawing, the optical axis Ax1 is almost parallel to the first direction X while the optical axis Ax2 is inclined with respect to the first direction X. If the liquid crystal molecule 32 is a positive liquid crystal molecule, the liquid crystal molecule 32 is aligned such that a major axis thereof will extend along an electric field. An electric field between the pixel electrode 13 and the common electrode 21 is formed in the third direction Z. Therefore, the liquid crystal molecule 32 is aligned such that a major axis thereof or the optical axis Ax2 will extend in the third direction Z. That is, the optical axes Ax1 and Ax2 intersect each other. Therefore, the refractive index of the polymer 31 and the refractive index of the liquid crystal molecule 32 greatly differ from each other in all directions including the first direction X, the second direction Y and the third direction Z. Therefore, the light L1 to the light L3 entering the liquid crystal layer 30 are scattered in the liquid crystal layer 30. The state shown in FIG. 9 is referred to as a scattering state.

FIG. 10 is a sectional view showing the display panel PNL in a case where the liquid crystal layer 30 is in the transparent state. Light L11 emitted from the light-emitting element LS enters the display panel PNL from the end E22 and propagates through the transparent substrate 20, the liquid crystal layer 30, the transparent substrate 10, etc. The liquid crystal layer 30 which overlaps the wiring line 11 and the pixel electrode 13 is in the transparent state. Therefore, the light L11 is hardly scattered in the liquid crystal layer 30 and hardly leaks from a lower surface 10B of the transparent substrate 10 and an upper surface 20T of the transparent substrate 20.

External light L12 entering the display panel PNL is hardly scattered in the liquid crystal layer 30 and is transmitted through the liquid crystal layer 30. That is, external light entering the display panel PNL from the lower surface 10B is transmitted through the upper surface 20T, and external light entering the display panel PNL from the upper surface 20T is transmitted through the lower surface 10B. Therefore, the user can visually recognize a background on the lower surface 10B side through the display panel PNL when the user views the display panel PNL from the upper surface 20T. Similarly, the user can visually recognize a background on the upper surface 20T side through the display panel PNL when the user views the display panel PNL from the lower surface 10B side.

FIG. 11 is a sectional view showing the display panel PNL in a case where the liquid crystal layer 30 is in the scattering state. Light L21 emitted from the light-emitting element LS enters the display panel PNL from the end E22 and propagates through the transparent substrate 20, the liquid crystal layer 30, the transparent substrate 10, etc. In the example illustrated, the liquid crystal layer 30 overlapping the wiring line 11 is maintained in the transparent state. Further, the liquid crystal layer 30 overlapping a pixel electrode 131 is in the transparent state. Therefore, the light L21 is hardly scattered in areas of the liquid crystal layer 30 which overlap the wiring line 11 and the pixel electrode 131. On the other hand, the liquid crystal layer 30 overlapping a pixel electrode 132 is in the scattering state. Therefore, the light L21 is scattered in an area of the liquid crystal layer 30 which overlaps the pixel electrode 132. Light L211 which is a part of the scattered light L21 is transmitted through the upper surface 20T, light L212 which is a part of the scattered light L21 is transmitted through the lower surface 10B, and the other scattered light propagates through the display panel PNL.

In the area overlapping the pixel electrode 131, external line L22 entering the display panel PNL is hardly scattered in the liquid crystal layer 30 and is transmitted through the liquid crystal layer 30 similarly to the external light L12 shown in FIG. 9. In the area overlapping the pixel electrode 132, external light L23 entering the display panel PNL from the lower surface 10B is scattered in the liquid crystal layer 30, and then light L231 which is a part of the external light L23 is transmitted through the upper surface 20T. Further, external light L24 entering the display panel PNL from the upper surface 20T is scattered in the liquid crystal layer 30, and then light L241 which is a part of the external light L24 is transmitted through the lower surface 10B.

Therefore, the user can visually recognize the color of the light L21 in the area overlapping the pixel electrode 132 when the user views the display panel PNL from the upper surface 20T side. In addition, since the external light L231 is transmitted through the display panel PNL, the user can also visually recognize the background on the lower surface 10B side through the display panel PNL. Similarly, the user can visually recognize the color of the light L21 in the area overlapping the pixel electrode 132 when the user views the display panel PNL from the lower surface 10B side. In addition, since the external light L241 is transmitted through the display panel PNL, the user van also visually recognize the background on the upper surface 20T side through the display panel PNL. In the area overlapping the pixel electrode 131, since the liquid crystal layer 30 is in the transparent state, the color of the light L21 is hardly visually recognized, and the user can visually recognize the background through the display panel PNL.

According to the present embodiment, at least the side E1 of the scanning line G1 located on the light-emitting element LS side has the curved portion CR1. Therefore, even if the light L propagating through the display panel PNL is scattered by the side E1, the scattered light is substantially isotropically scattered from the curved portion CR1. In other words, the directivity of the scattered light is reduced in the display panel PNL. Therefore, the unevenness of luminance of the scattered light in the display panel PN1 can be suppressed, and degradation of display quality can be suppressed.

Further, according to the present embodiment, the side 13a of the pixel electrode 13 on the light-emitting element LS side is curved. Further, at least the side E5 of the capacitive line C located on the light-emitting element LS side is curved. Therefore, the directivity of the light scattered by the side 13a and the directivity of the light scattered by the side E5 are also reduced similarly to that of the light scattered by the curved portion CR1. As a result, degradation of display quality can be suppressed.

The present embodiment is also applicable to, for example, a display device in which the scanning lines G1 and G2 extend in the second direction Y and the signal lines S1 and S2 extend in a direction intersecting the scanning lines G1 and G2. In this case, the same advantages can be obtained by curving the signal lines S1 and S2 between the scanning line G1 and the scanning line G2.

FIG. 12 is a plan view showing another example of the pixel PX. The example shown in FIG. 12 differs from the example shown in FIG. 6 in that the scanning lines G1 and G2 are convex toward the side away from the light-emitting element LS.

More specifically, the curved portions CR1 and CR2 in the scanning line G1 are convex toward the side away from the light-emitting element LS. The side E1 located between the signal line S1 and the signal line S2 is farther from the light-emitting element LS than the side E1 overlapping the signal lines S1 and S2 is from the light-emitting element LS. Similarly, the side E2 located between the signal line S1 and the signal line S2 is farther from the light-emitting element LS than the E2 overlapping the signal lines S1 and S2 is from the light-emitting element LS. In the example illustrated, the sides E1 and E2 are farthest to the light-emitting element LS substantially at the center between the signal line S1 and the signal line S2.

In the example illustrated, the switching element SW is electrically connected to the signal line S2 and the scanning line G2. The scanning line G2 has the same shape as that of the scanning line G1. In the pixel electrode 13, the side 13a is curved along the side E2, and the side 13b is curved along the side E3. That is, the sides 13a and 13b are convex toward the side away from the light-emitting element LS. Further, in the example illustrated, the capacitive line C is located on the scanning line G1 side and is curved along the side E2. The side E5 is aligned with the side 13a in a plan view. Further, the side E6 is curved similarly to the side E5.

As shown by arrows of thin solid lines in the drawing, light scattered by the curved portion CR1 in the side E1 is concentrated between the side E1 and the light-emitting element LS and is then diffused substantially isotropically. Similarly, light reflected by the curved portion in the side E3 is concentrated between the side E3 and the side E2 and is then diffused substantially isotropically. Although not shown in the drawing, the same is also applied to the light scattered in the side 13a. Therefore, the same advantages as those obtained from the example shown in FIG. 6 can also be obtained from the present example.

Figure 13:
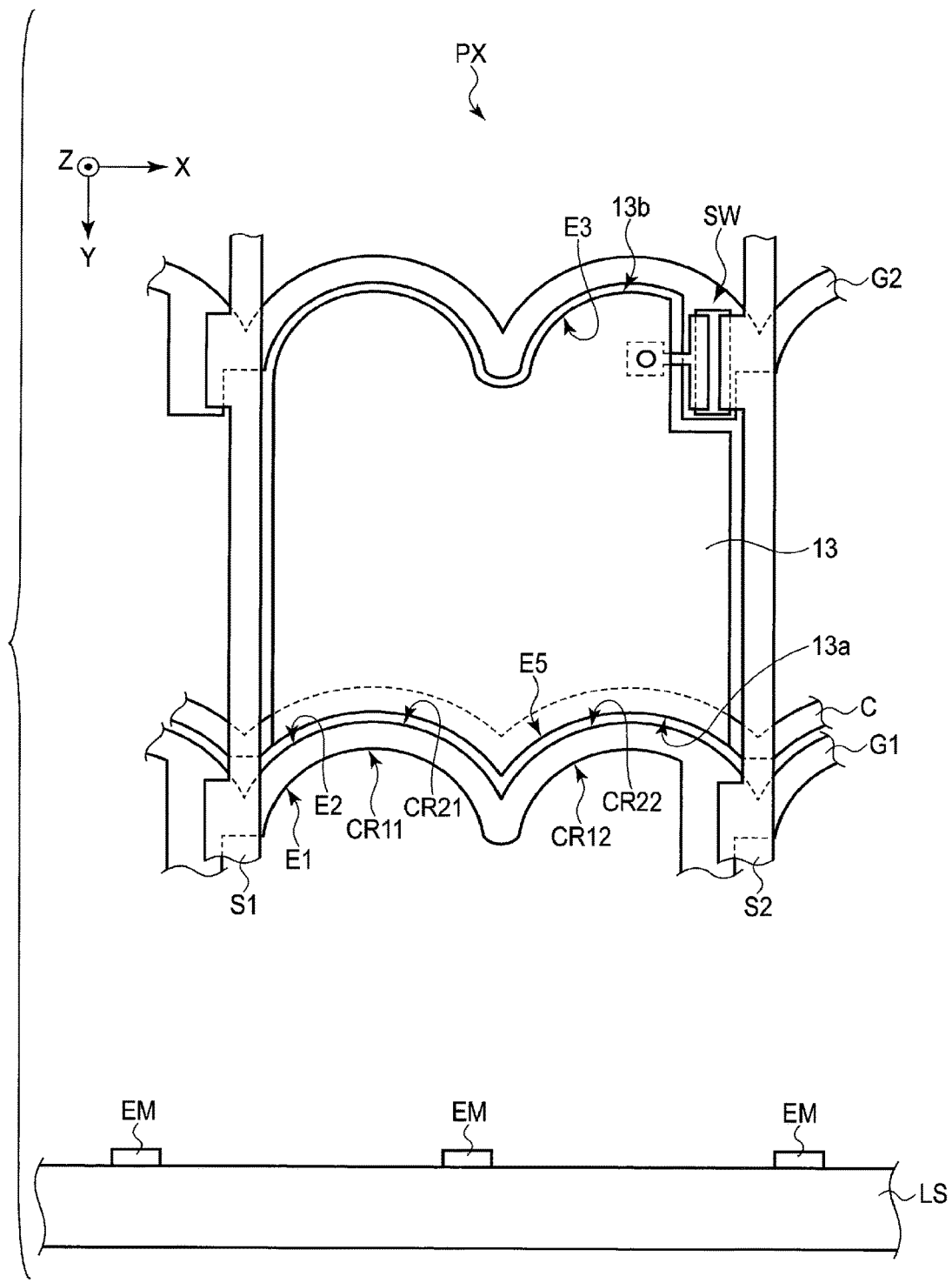
FIG. 13 is a plan view showing another example of the pixel.

FIG. 13 is a plan view showing another example of the pixel PX. The example shown in FIG. 13 differs from the example shown in FIG. 12 in that each of the sides E1 and E2 has a plurality of curved portions.

The side E1 has two curved portions CR11 and CR12 arranged in the first direction X. The side E2 has a curved portion CR21 curved along the curved portion CR11, and a curved portion CR22 curved along the curved portion CR12. The curved portions CR11, CR12, CR21 and CR22 are convex toward the side way from the light-emitting element LS. The radius of curvature of the curved portion CR11 and the radius of curvature of the curved portion CR12 are substantially equal to each other in the example illustrated but may be different from each other.

In the pixel electrode 13, the side 13a has two curved portions along the side E2, and the side 13b has two curved portions along the side E3. In the capacitive line C, the side E5 is aligned with the side 13a and is curved along the side E2. The same advantages as those obtained from the example shown in FIG. 12 can also be obtained from the present example.

FIG. 14 is a plan view showing another example of the pixel PX. The example shown in FIG. 14 differs from the example shown in FIG. 13 in that a part of the side E1 extends linearly. In the example illustrated, the curved portions CR11, CR12, CR21 and CR22 are convex toward the light-emitting element LS side.

The side E1 has a linear portion LN1 which extends linearly on a side on which the switching element SW is provided between the signal line S1 and the signal line S2. In the example illustrated, the linear portion LN1 is located between the curved portion CR12 and the signal line S2, more specifically, between the curved portion CR12 and the gate electrode GE. For example, the linear portion LN1 extends in the first direction X. The side E2 has a linear portion LN2 which extends along the linear portion LN1. Further, in the example illustrated, the side 13a and the side E5 have linear portions along the linear portion LN1. The same advantages as those obtained from the example shown in FIG. 13 can also be obtained from the present example.

FIG. 15 is a plan view showing another example of the pixel PX. The example shown in FIG. 15 differs from the example shown in FIG. 13 in that the curved portion CR11 and the curved portion CR12 are convex in opposite directions. In the example illustrated, the switching element SW is electrically connected to the signal line S1 and the scanning line G1.

In the example illustrated, the curved portions CR11 and CR21 are convex toward the light-emitting element LS side. The curved portions CR12 and CR22 are convex toward the side away from the light-emitting element LS. The curved portions CR11 and R21 may be convex toward the side away from the light-emitting element LS, and the curved portions CR12 and CR22 may be convex toward the light-emitting element LS side. Further, the curved portions CR11, CR12, CR21 and CR22 have the shape of the circumference of a circle in the example illustrated but may have another shape. For example, the sides E1 and E2 may have the shape of a sine wave.

The side 13a has an area which is convex toward the light-emitting element LS side and an area which is convex toward the side away from the light-emitting element LS along the side E2. Similarly, the side 13b has an area which is convex toward the light-emitting element LS side and an area which is convex toward the side away from the light-emitting element LS along the side E3. In the example illustrated, the capacitive line C is located on the scanning line G2 side and is curved similarly to the side 13b. The same advantages as those obtained from the example shown in FIG. 13 can also be obtained from the present example.

FIG. 16 is a plan view showing another example of the pixel PX. The example shown in FIG. 16 differs from the example shown in FIG. 6 in that the pixel electrode 13 overlaps the scanning lines G1 and G2. That is, the shape of the pixel electrode 13 differs from the shape of an area surrounded by the signal lines S1 and S2 and the scanning lines G1 and G2. For example, the pixel electrode 13 has a substantially rectangular shape. The sides 13a and 13b extend linearly in the first direction X.

In the example illustrated, the scanning line G2 and the capacitive line C mostly overlap the pixel electrode 13 between the signal line S1 and the signal line S2. In other word, the scanning line G2 and the capacitive line C are located on the light-emitting element LS side from the side 13b. On the other hand, the scanning line G1 mostly does not overlap the pixel electrode 13 between the signal line S1 and the signal line S2. In the example illustrated, the scanning line G1 is located on the light-emitting element LS side from the side 13a and overlaps a pixel electrode 13A which is adjacent to the pixel electrode 13 in the second direction Y. The same advantages as those obtained from the example shown in FIG. 6 can also be obtained from the present example.

Figure 17:
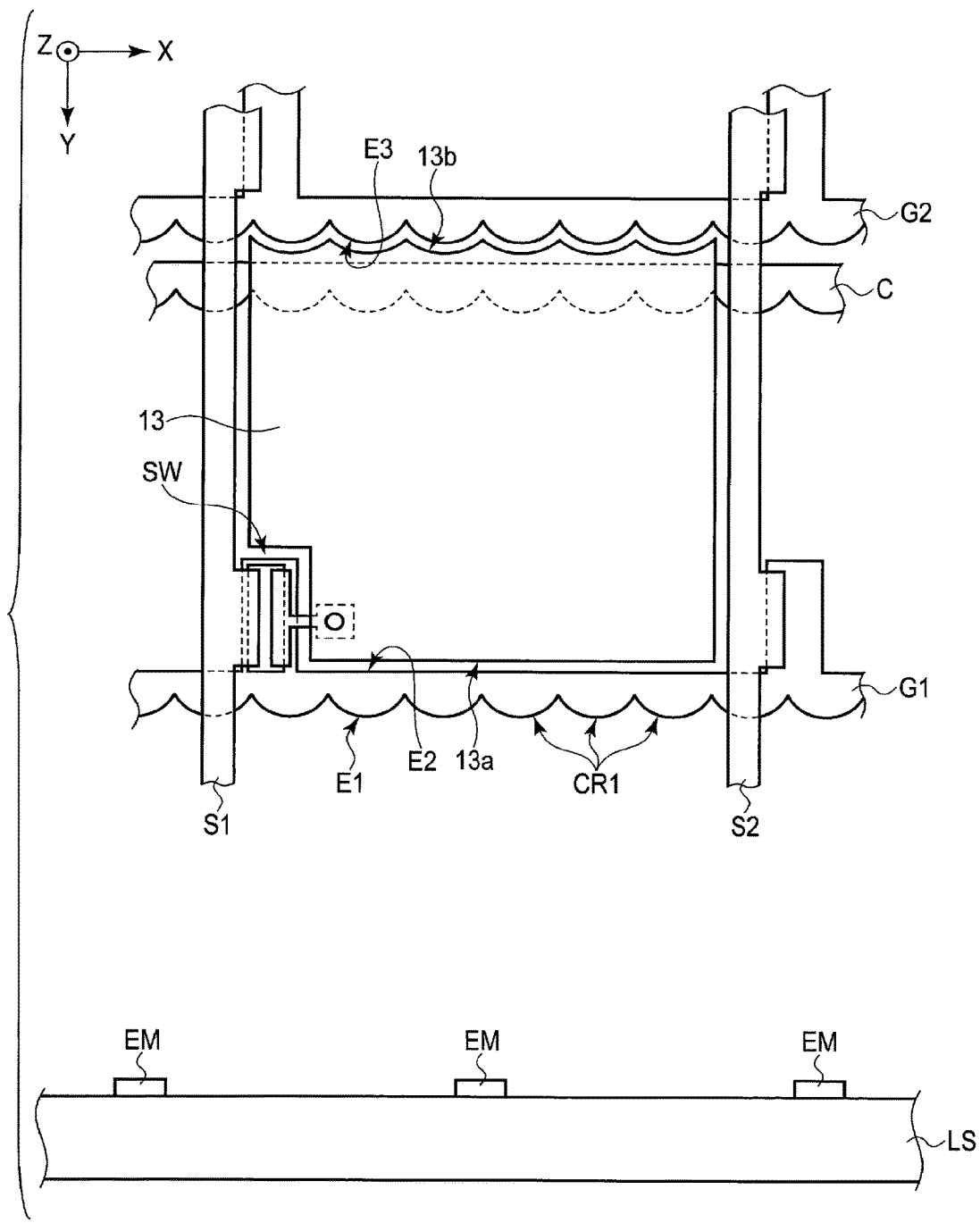
FIG. 17 is a plan view showing another example of the pixel.

FIG. 17 is a plan view showing another example of the pixel PX. The example shown in FIG. 17 differs from the example shown in FIG. 6 in that the side E2 extends linearly between the signal line S1 and the signal line S2. The side E1 has the plurality of curved portions CR1 arranged in the first direction X. In other words, the distance between the side E1 and the side E2 is not constant between the signal line S1 and the signal line S2. The scanning line G1 can be assumed to have a plurality of convex portions on the side opposed to the light-emitting element LS. In the example illustrated, the scanning line G2 and the capacitive line C have the same shape as that of the scanning line G1. In the pixel electrode 13, the side 13a extends linearly along the side E2. On the other hand, the side 13b has a plurality of curved portions along the side E3.

The same advantages as those obtained from the example shown in FIG. 6 can also be obtained from the present example. Further, according to the present example, the length of the scanning lines G1 and G2 in the pixel PX can be reduced, and therefore the resistance of the scanning lines G1 and G2 can be reduced.

FIG. 18 is a plan view showing another example of the pixel PX. The example shown in FIG. 18 differs from the example shown in FIG. 12 in that two light-emitting elements LS1 and LS2 are provided in such a manner as to sandwich the pixel PX in the second direction Y. In the example illustrated, the light-emitting element LS2, the scanning line G2, the scanning line G1 and the light-emitting element LS1 are arranged in this order in the second direction Y.

Light LL1 emitted from the light-emitting element LS1 is scattered similarly to the example shown in FIG. 12. That is, the light LL1 is mainly scattered by the side E1 in the scanning line G1 and is mainly scattered by the side E3 in the scanning line G2. In the side E1, light scattered by the curved portion CR1 is concentrated between the side E1 and the light-emitting element LS1 and is then diffused substantially isotropically as shown by arrows of thin solid lines in the drawing. Similarly, in the side E3, light scattered by the curved portion of the side E3 is concentrated between the side E2 and the side E3 and is then diffused substantially isotropically. The same is also applied to the light scattered in the side 13a.

Light LL2 emitted from the light-emitting element LS2 is scattered similarly to the example shown in FIG. 6. That is, the light LL2 is mainly scattered by the side E2 in the scanning line G1 and is mainly scattered by the side E4 in the scanning line G2. In the side E2, light scattered by the curved portion CR2 is diffused substantially isotropically as shown by arrows of thin solid lines in the drawing. Similarly, in the side E4, light scattered by the curved portion of the side E4 is diffused substantially isotropically. The same is also applied to the light scattered in the side 13b.

According to the present example, the display device DSP has two light-emitting elements LS1 and LS2 which are opposed to each other in the second direction Y. The light LL1 emitted from the light-emitting element LS1 propagates in the opposite direction to the second direction Y, and the light LL2 emitted from the light-emitting element LS2 propagates in the second direction Y. Therefore, the light propagating through the display panel PNL will be prevented from being attenuated in one direction.

Further, according to the present example, in the scanning line G1, the side E1 located on the light-emitting element LS1 side has the curved portion CR1, and the side E2 located on the light-emitting element LS2 side has the curved portion CR2. The light LL1 is mainly diffused isotropically from the curved portion CR1, and the light LL2 is mainly diffused isotropically from the curved portion CR2. Therefore, even if the light-emitting elements LS1 and LS2 are provided on both sides in such a manner as to sandwich the scanning line G1, the directivity of scattered light can be reduced in the display panel PNL. As a result, in the present example also, the unevenness of the luminance of the scattered light in the display panel PN1 can be suppressed, and degradation of display quality can be suppressed.

In the above-described examples, the signal line S1 corresponds to the first wiring line, and the signal line S2 corresponds to the second wiring line. The scanning line G1 corresponds to the third wiring line. The side E1 corresponds to the first side. The side E2 corresponds to the second side. The curved portions CR1 and CR11 correspond to the first curved portion. The curved portions CR2 and CR21 correspond to the second curved portion. The curved portion CR12 corresponds to the third curved portion. The curved portion CR22 corresponds to the fourth curved portion. The side 13a corresponds to the third side. The capacitive line C corresponds to the fourth wiring line. The side E5 corresponds to the fourth side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a first substrate comprising a first wiring line and a second wiring line which are adjacent to each other, and a third wiring line which intersects the first wiring line and the second wiring line;
    a second substrate opposed to the first substrate;
    a liquid crystal layer held between the first substrate and the second substrate and containing a polymer subjected to alignment treatment and a liquid crystal molecule; and
    a first light-emitting element including light-emitting portions which are arranged in a first direction, wherein
    the first wiring line and the second wiring line extend in a second direction intersecting the first direction, and
    the third wiring line has a first side located on a side close to the light-emitting element, and
    the first side has a first curved portion which is curved between the first wiring line and the second wiring line.

2. The display device of claim 1, wherein
    the third wiring line has a second side located on a side away from the light-emitting element, and
    the second side has a second curved portion which is curved along the first curved portion between the first wiring line and the second wiring line.

3. The display device of claim 2, wherein
    the first substrate further comprises a pixel electrode located between the first wiring line and the second wiring line,
    the third wiring line is located between the light-emitting element and the pixel electrode, and
    the pixel electrode has a third side which is opposed to the second side and is curved along the second side.

4. The display device of claim 2, wherein
    the first substrate further comprises a pixel electrode located between the first wiring line and the second wiring line,
    the third wiring line is located between the light-emitting element and the pixel electrode, and
    the pixel electrode has a third side which is opposed to the second side and extends linearly.

5. The display device of claim 1, wherein the third wiring line has a second side which is located on a side away from the light-emitting element and extends linearly.

6. The display device of claim 5, wherein
    the first substrate further comprises a pixel electrode located between the first wiring line and the second wiring line,
    the third wiring line is located between the light-emitting element and the pixel electrode, and
    the pixel electrode has a third side which is opposed to the second side and extends linearly.

7. The display device of claim 1, wherein
    the first substrate comprises a switching element which is electrically connected to the first wiring line and the third wiring line, and
    the first curved portion is located between the switching element and the second wiring line.

8. The display device of claim 1, wherein the first curved portion is convex toward a light-emitting element side.

9. The display device of claim 1, wherein the first curved portion is convex toward a side away from the light-emitting element.

10. The display device of claim 1, wherein
    the first side has a third curved portion which is curved between the first wiring line and the second wiring line, and
    the first curved portion and the third curved portion are convex toward a same side.

11. The display device of claim 10, wherein
    the third wiring line has a second side located on a side away from the light-emitting element, and
    the second side has a second curved portion which is curved along the first curved portion and a fourth curved portion which is curved along the third curved portion between the first wiring line and the second wiring line.

12. The display device of claim 1, wherein
    the first side has a third curved portion which is curved between the first wiring line and the second wiring line, and
    the first curved portion and the third curved portion are convex toward opposite sides.

13. The display device of claim 12, wherein
    the third wiring line has a second side located on a side away from the light-emitting element,
    the second side has a second curved portion which is curved along the first curved portion and a fourth curved portion which is curved along the third curved portion between the first wiring line and the second wiring line.

14. The display device of claim 1, wherein a radius of curvature of the first curved portion is less than or equal to half a distance between the first wiring line and the second wiring line.

15. The display device of claim 1, wherein
    the first substrate further comprises a pixel electrode located between the first wiring line and the second wiring line,
    the third wiring line is located between the light-emitting element and the pixel electrode,
    the pixel electrode has a third side opposed to the third wiring line, and
    the third side is curved.

16. The display device of claim 1, wherein
    the first substrate further comprises a fourth wiring line which intersects the first wiring line and the second wiring line,
    the fourth wiring line has a fourth side located on a side close to the light-emitting element, and
    the fourth side is curved.

17. The display device of claim 1, further comprising a second light-emitting element including light-emitting portions which are arranged in the first direction, wherein the third wiring line is located between the first light-emitting element and the second light-emitting element.

\* \* \* \* \*